(No Model.)
J. EMERSON.
STEAM AND AIR PIPE COUPLING FOR RAILWAY CARS.
No. 443,936. Patented Dec. 30, 1890.
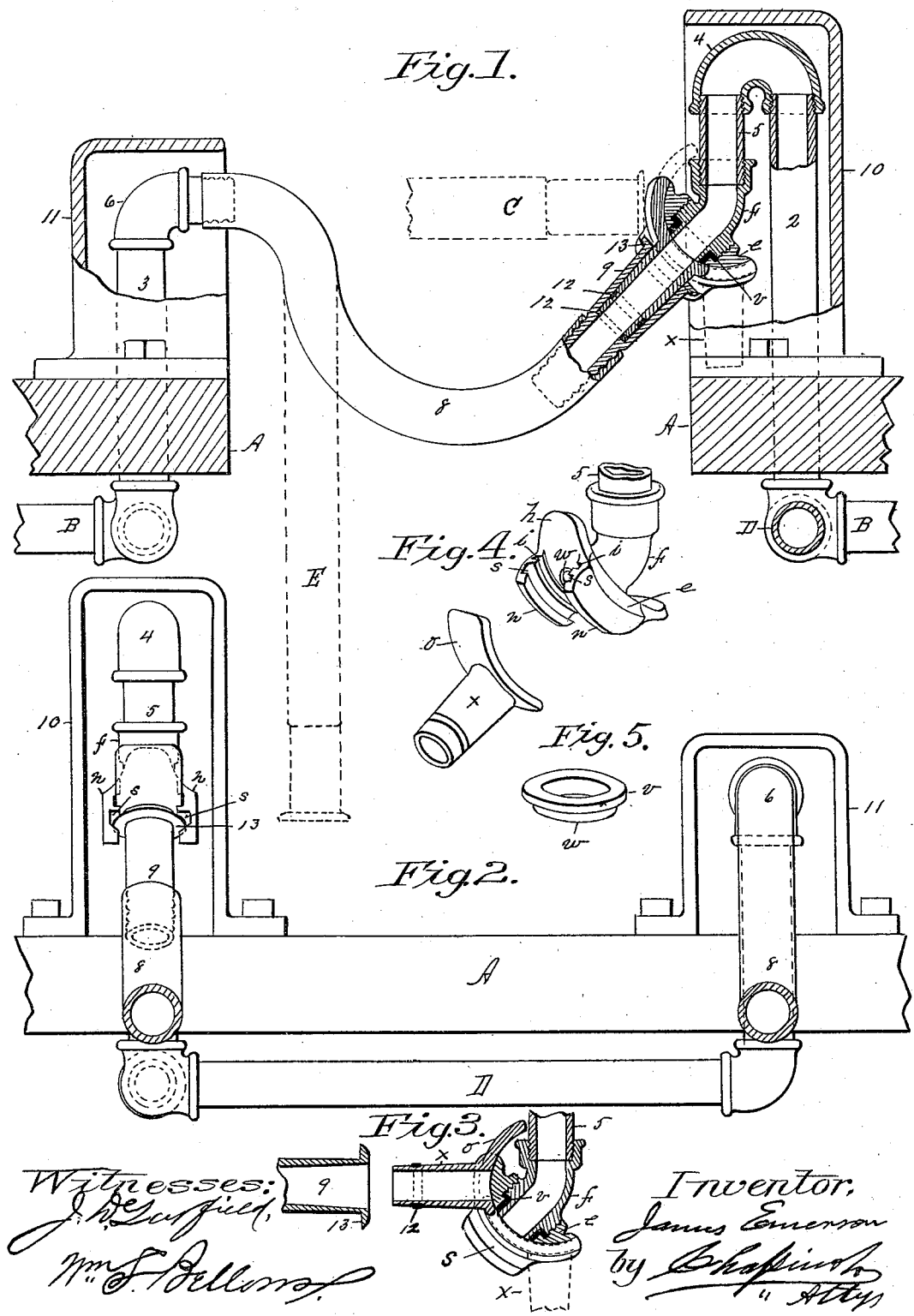

UNITED STATES PATENT OFFICE.

JAMES EMERSON, OF WILLIMANSETT, MASSACHUSETTS.

STEAM AND AIR PIPE COUPLING FOR RAILWAY-CARS.

SPECIFICATION forming part of Letters Patent No. 443,936, dated December 30, 1890.

Application filed June 5, 1890. Serial No. 354,313. (No model.)

*To all whom it may concern:*

Be it known that I, JAMES EMERSON, a citizen of the United States, residing at Willimansett, in the county of Hampden and State of Massachusetts, have invented new and useful Improvements in Steam and Air Pipe Couplings for Railway-Cars, of which the following is a specification.

This invention relates to steam and air pipe connections between railway-cars, the object being to provide improved safe and practicable couplings or communications for the above-named purpose, whereby the coupling devices are operated by a person standing on the platform of the car both to connect and disconnect the same, thereby obviating the dangerous practice heretofore prevailing of going under the car-platforms to perform said duties, which are rendered far more disagreeable and dangerous since the introduction of steam-heating by steam from the boiler of the engine.

In the drawings forming part of this specification, Figure 1 is a view partly in section, showing portions of the platforms of two cars and portions of a steam or air pipe under said platforms, and having branches extending from thence upward to a point above said platforms and showing coupling devices between the pipes of said two platforms, all constructed according to my invention. Fig. 2 is a front elevation of a portion of a car-platform, showing the arrangement thereon of the above-mentioned coupling devices. Fig. 3 is a sectional view of the valve of the coupling and of the coupling-hose sleeve. Fig. 4 is a perspective view of the valve-body and of the valve-gate and nozzle combined. Fig. 5 is a perspective view of a flexible packing-ring for the valve, and is fully described below.

In the drawings, A indicates the front sill or portion of the platform of a car, and B a portion of a steam or air conduit running under the car-floor for the purpose of conducting steam to pipes within the car for warming purposes or for conducting compressed air to ordinary air-brake devices.

D indicates a cross-pipe connection under the platform A. This cross connection is shown in section at the right in Fig. 1 and in dotted lines at the left in same figure. From or near the ends of said pipe D two upright branch pipes 2 and 3 extend, passing preferably through the sill of the platform and terminating at or near the upper side thereof, or at such point in relation thereto that the coupling devices shall all be within convenient reach of a person on said platform for manipulation thereof in operating the same for coupling and uncoupling. The upper end of one of said upright branch pipes 2 is provided with a return-bend 4 or other equivalent connection, which provides for connecting with said pipe 2 a shorter pending pipe 5, and the other upright branch pipe 3 is provided with an elbow 6 or other equivalent connection, which is adapted to receive a sleeve 7, which is screwed therein, to the outer end of which is permanently attached the end of a piece of flexible hose 8, and to the opposite end of said hose 8 is permanently attached an internally-tapering sleeve 9, preferably of brass or other similar metal not likely to rust.

The dotted lines in Fig. 1 (shown at E) indicate the position which the hose 8 and its coupling-sleeve 9 take when the latter is disconnected from the coupling devices of the opposite car-platform, and the dotted lines C in Fig. 1 indicate the position of said coupling-sleeve 9 and the hose 8 thereto attached when the said coupling-sleeve is disconnected from the connections which are attached to the said upright branch pipe 2.

Those portions of the pipes 2 and 3 which project above the platforms A of the cars are preferably protected by strong metallic hoods or boxes 10 and 11 open on their outer or adjoining sides, as shown. Said hoods may be conveniently made of cast-iron, and are in practice about eight and twelve inches high, and are firmly bolted to the upper side of the platform. These hoods prevent anything from striking and disarranging the pipes and connection parts which they inclose.

The constant liability of car-couplings to break in service renders it highly desirable that such couplings as are provided for connecting the ends of steam and air-brake pipes between the cars shall be capable of automatic detachment when such car-coupling breakage occurs, in order that at the same time the couplings between said pipes shall not become broken and disabled, and to that end, and also to provide a valve for said car-coupling devices which is easily and quickly manipulated by hand for connecting and disconnecting, the below-described valve is preferably applied for uniting the pipe-connections of two cars. The said coupling-valve consists of a body portion $e$, to which a pipe-socket arm $f$ is firmly screwed, and of a valve-gate $o$ and nozzle $x$ combined. A packing-ring, of leather or vulcanized rubber $v$ or similar flexible material, is inserted in a chamber in said valve-body $e$, as shown in Figs. 1 and 3, and its lower edge $w$ projects slightly beyond the face $h$ of said valve-body, and the latter is provided with two lips $n\ n$ extending at right angles to said face $h$, in the inner face of which lips are two grooves $i\ i$ and two other grooves $s\ s$. The said valve-gate $o$ has a sliding attachment with the valve-body $e$ by means of the engagement of its borders in the grooves $i\ i$ in the inner sides of the lips $s$ on said body, whereby said gate is moved with its nozzle $x$ to different positions on the face of the valve-body. One of those positions is shown in Fig. 1, wherein the passage through the nozzle $x$ is brought into direct line or communication with the passage through the arm $f$ of the valve, and thence by the connections above described with the interior of the branch pipe 2, and through the latter with the pipes D and B. Another position to which the said valve $o$ and the nozzle $x$ may be moved on the valve-body is shown in Fig. 3, wherein the said nozzle is brought to a position about at right angles to the upright branch pipe 2, and a third position to which the said gate $o$ and nozzle $x$ may be brought on the valve-body is indicated in dotted lines in Figs. 1 and 3, whereby the nozzle $x$ is brought to a pending position, and the upper extended portion of the valve $o$ (shown in Fig. 4) is brought over the open end of the socket-arm $f$ and the end $w$ of the packing-ring $v$ on the face $h$ of the valve-body $e$, thereby tightly closing the passage through the socket-arm $f$, and preventing the escape of either air or steam from the pipe 2 through the valve. The said nozzle $x$ is preferably provided with one or two packing-rings 12, of vulcanized rubber, leather, or similar flexible material placed in an annular groove or grooves around said nozzle, as shown, so that when the sleeve 9, which is secured to one end of the base 8 shall, when placed on said nozzle, be so packed thereon that there shall be no leakage between it and said nozzle; but if preferred said sleeve may be ground to a tight fit on the nozzle. The said sleeve 9 is provided at its extremity farthest from the hose with an annular rim or flange 13, by which the sleeve is connected or in engagement with the grooves $s$ in the lips $n$ of the valve-body, whereby the sleeve is held rigidly and closely on said nozzle, but is permitted to have a bodily swinging motion in unison with said nozzle. The extent of said grooves $s\ s$ is such that when the said nozzles and the sleeve 9 are swung upward to about a horizontal position, and as would be the case under a strain incidental to a separation of the cars, substantially as indicated in Fig. 1, by the dotted lines C, the rim 13 of said sleeve is free from said grooves $s$, having in its upward slide passed out of engagement therewith, and the sleeve may be pulled off from the nozzle; but when the parts are in the position shown in Figs. 1 and 2 the sleeve is tightly held on the nozzle $x$.

It is of course understood that while on a certain extent of upward swing of the valve-gate and nozzle with the sleeve the latter may be disengaged from the groove, there are portions of the rib-like sides of the valve-gate still in engagement with the side of the grooves or ways $i\ i$ therefor. There is no possibility of the valve-gate and nozzle being swung upwardly, so far that the latter will be free from the grooves $i\ i$ therefor, for on noting the drawings, Figs. 1 and 3, it will be noted that by the contact of the upper end of the extended portion $o$ with the pipe 5 the valve-gate will be restrained in its interlocked relation with the socket-arm.

As shown in Fig. 2, the platform of each car is fitted with the coupling-pipes and connections shown, respectively, under the hoods 10 and 11, so that when the cars are brought end to end the set of connections shown under the hood 10 shall be brought opposite to those shown under the hood 11, as indicated in Fig. 1, whereby the coupling-connections are made directly across from the pipe 3 to the pipe 2 of the opposite car.

In Fig. 2 the hose portion 8 of the couplings is shown in cross-section, and this figure, were the line of hose continued horizontally from the hood 11 to the hood 10, correctly represents the arrangement of the coupling-connections on the rear end of the last car of the train, the sleeve 9 being connected with the nozzle $x$ in substantially the position shown in Fig. 1, but with the hose part of the coupling extending transversely from hood to hood of the same car, instead of from the hood 11 of one car to the hood 10 of the next car. This cross-connection provides for hermetically closing the rear end of the main air or steam pipe of the car.

The manipulation and operation of the within-described improved coupling devices are as follows: Assuming that two cars are connected by the coupling devices, as illustrated in Fig. 1, and the car-coupling should accidentally break, thereby permitting the cars to separate, such separation would tend to straighten the hose 8, bringing it and the sleeve 9 to the positions substantially indicated by the dotted lines C, and in bringing them to such positions said sleeve, the nozzle $x$, and the valve-gate $o$ are caused to swing on the valve-body $e$, thereby bringing the flange 13 of said sleeve quite out of engagement with the grooves $s$ of said body, and permitting the sleeve to be drawn off from said nozzle and the pipe-couplings to be thereby automatically disconnected without injury to any part thereof and letting the hose and its sleeve drop down to the position indicated by the dotted lines E. After said separation of cars a person on the end of a car to which the valve is attached may swing the nozzle *x* downward to a substantially vertical position, as indicated by dotted lines in Figs. 1 and 3, thereby closing the valve by bringing the gate *o* over the outlet thereof, and since the same action has taken place on the other part of the train by the said breaking of the car-coupling, as regards the connection of the hose 8 with the valve, the nozzle of the latter may be left extending horizontally from the pipe 2, or it may be swung down to the position indicated in Fig. 1; but when connection shall be again made therewith of the sleeve 9, which parted therefrom, it should be in a horizontal position, and after receiving thereupon said sleeve be swung downward again to engage the rim 13 thereon in the grooves *s*, whereby it is again locked to the valve-body.

The within-described coupling devices are especially useful and advantageous as couplings for steam-pipes of cars when the air-brake couplings of said cars run under the platforms, as is usual, such couplings ordinarily occupying positions about centrally between the sides of the car, and since the within-described couplings extend between the cars, each side of said central line between the sides thereof there can be no danger that any water of condensation shall drip from the couplings, as herein described, onto the couplings between the ends of said air-brake connections, and, as is often the case in cold weather, causing them to be so thickly coated with ice that it is difficult to disconnect the air-brake couplings, and such difficulty of disconnection thereof often results disastrously as to the breakage of such parts by separating the cars before such disconnection can be effected.

A further important effect of the above-described automatic disconnection of the coupling devices of the cars when applied to the air-brake pipes thereof is that such disconnection operates to open the valve, as above set forth, thereby causing the air-brakes as now commonly arranged to be applied to the forward part of the train, thereby stopping it and preventing the rear part thereof from being left far behind, as has been the case, with fatal results.

What I claim as my invention is—

1. The combination, with the extremity of an air or steam supply pipe of a railway-car, of a stop-valve connected to said extremity having a face through which the valve-passage opens, lips extending from the borders of said face at right angles thereto, having grooves in the inner opposite sides thereof, a valve-gate having a sliding motion on said face and having its borders engaging with two of said grooves and having a nozzle thereon, a coupling-sleeve fitting on said nozzle and having a laterally-extending rim thereon engaging with two of said grooves, and a flexible coupling-pipe connected to said sleeve, substantially as set forth.

2. A stop-valve for steam or air pipe connections between railway-cars, consisting of a body having a face through which the valve-passage opens and having lips extending from the borders of said face at right angles thereto, having grooves in the inner opposite sides thereof, combined with a valve-gate having a sliding motion on said face to open and cover said passage and having its borders engaging with two of said grooves and having a nozzle thereon, and a socketed arm on the side of said body, substantially as set forth.

3. A stop-valve for steam or air pipe connections between railway-cars, consisting of a body having a face through which the valve-passage opens, a packing-ring of flexible material inserted in said body and extending into said passage, and having lips extending from the borders of said face at right angles thereto, having grooves in the inner opposite sides thereof, combined with a valve-gate having a sliding motion on said face to open and cover said passage and having its borders engaging with two of said grooves and having a nozzle thereon, and a socketed arm screwing into said body and against said packing-ring, substantially as set forth.

4. The combination, with the extremity of an air or steam supply pipe of a railway-car, of a stop-valve connected to said extremity having an arc-shaped face through which the valve-passage opens, lips extending from the borders of said face at right angles thereto, having grooves in the inner opposite sides thereof, a valve-gate having a form coinciding with said arc-shaped valve-face, having a sliding motion thereon, and having its borders engaging with two of said grooves, and having a nozzle thereon, and a socketed arm on the rear side of said body, substantially as set forth.

JAMES EMERSON.

Witnesses:
H. A. CHAPIN,
WM. S. BELLOWS.